United States Patent
An

(10) Patent No.: US 9,473,607 B2
(45) Date of Patent: *Oct. 18, 2016

(54) MOBILE PHONE HOLDER FOR VEHICLE

(71) Applicants: Hyundai Motor Company, Seoul (KR); Kia Motors Corporation, Seoul (KR)

(72) Inventor: Jaehyun An, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,371

(22) Filed: Dec. 1, 2014

(65) Prior Publication Data

US 2015/0189055 A1  Jul. 2, 2015

(30) Foreign Application Priority Data

Dec. 26, 2013  (KR) .................. 10-2013-0164095

(51) Int. Cl.
*H04B 1/38* (2015.01)
*H04M 1/11* (2006.01)
*B60R 11/02* (2006.01)
*B60R 11/00* (2006.01)

(52) U.S. Cl.
CPC ............ *H04M 1/11* (2013.01); *B60R 11/0241* (2013.01); *B60R 2011/0005* (2013.01); *B60R 2011/0059* (2013.01); *B60R 2011/0071* (2013.01)

(58) Field of Classification Search
CPC .. H04W 52/02; H04M 1/0262; H02J 7/0044
See application file for complete search history.

(56) References Cited

U.S. PATENT DOCUMENTS

| | | |
|---|---|---|
| D457,511 S | 5/2002 | Yuen |
| 6,757,401 B2 | 6/2004 | Uchimura et al. |
| D560,523 S | 1/2008 | Nakamura |
| D560,525 S | 1/2008 | Skelton et al. |
| D560,526 S | 1/2008 | Skelton et al. |
| D565,980 S | 4/2008 | Reeson et al. |
| D566,590 S | 4/2008 | Stevens et al. |
| D580,804 S | 11/2008 | Gretton |
| D626,439 S | 11/2010 | Lee et al. |
| D629,315 S | 12/2010 | McAlpine et al. |
| D629,316 S | 12/2010 | Riddiford |

(Continued)

FOREIGN PATENT DOCUMENTS

| | | |
|---|---|---|
| JP | 06-006299 A | 1/1994 |
| KR | 20-0215028 Y1 | 12/2000 |

(Continued)

*Primary Examiner* — Shantell L Heiber
(74) *Attorney, Agent, or Firm* — Morgan, Lewis & Bockius LLP

(57) ABSTRACT

A mobile phone holder for a vehicle mounted to a docking portion which is provided with a power plug and formed to a center fascia may include a supporter selectively mounted to the docking portion and a connecting pin connected with the power plug provided at an end of the supporter, a center cradle provided with a connecting terminal thereto, an upper cradle supporting an upper portion of a mobile phone, a moving unit disposed within the center cradle and selectively sliding the upper cradle according to a size of the mobile phone, and a charging unit provided with a charging connector electrically connected with the connecting terminal corresponding to a charging terminal of the mobile phone, and the charging unit fixing the mobile phone to the center cradle by connecting the charging terminal of the mobile phone with the charging connector.

18 Claims, 6 Drawing Sheets

(56) References Cited

U.S. PATENT DOCUMENTS

| | | |
|---|---|---|
| D629,317 S | 12/2010 | Riddiford |
| D630,955 S | 1/2011 | McAlpine et al. |
| D631,424 S | 1/2011 | Riddiford |
| 8,159,818 B2 * | 4/2012 | Riddiford ............ B60R 11/0258 312/223.1 |
| D659,571 S | 5/2012 | Hoggarth et al. |
| D659,573 S | 5/2012 | Riddiford et al. |
| 8,224,408 B2 | 7/2012 | Tomasini et al. |
| D672,341 S | 12/2012 | Mo |
| 8,353,491 B2 | 1/2013 | Mezue |
| 2005/0047081 A1 * | 3/2005 | LaPorte ............... B60R 11/0252 361/679.41 |
| 2006/0105819 A1 | 5/2006 | Liao |
| 2006/0231713 A1 | 10/2006 | Crain et al. |
| 2007/0036154 A1 * | 2/2007 | Lipman ................. H02J 7/0044 370/356 |
| 2008/0121273 A1 | 5/2008 | Plaisted et al. |
| 2009/0186666 A1 * | 7/2009 | Bury .................... B60R 11/0241 455/573 |
| 2009/0213536 A1 * | 8/2009 | Lewandowski ....... G06F 1/1632 361/679.43 |
| 2009/0294609 A1 | 12/2009 | Riddiford et al. |
| 2010/0001155 A1 | 1/2010 | Grundy et al. |
| 2011/0216500 A1 | 9/2011 | van den Elzen |
| 2011/0233249 A1 | 9/2011 | Nakajima |
| 2011/0233250 A1 | 9/2011 | Nakajima et al. |

FOREIGN PATENT DOCUMENTS

| | | |
|---|---|---|
| KR | 10-2012-0037856 A | 4/2012 |
| KR | 10-2012-0067022 A | 6/2012 |
| KR | 10-2012-0138564 A | 12/2012 |
| KR | 10-2013-0011392 A | 1/2013 |

* cited by examiner

MOBILE PHONE HOLDER FOR VEHICLE

CROSS-REFERENCE TO RELATED APPLICATION

The present application claims priority to Korean Patent Application No. 10-2013-0164095 filed Dec. 26, 2013, the entire contents of which is incorporated herein for all purposes by this reference.

BACKGROUND OF THE INVENTION

1. Field of the Invention

The present invention relates to a mobile phone holder, more particularly, the present invention relates to a mobile phone holder which may change a charging connector to be used to a various kind of a charging terminal of various mobile phones.

2. Description of Related Art

A mobile phone holder is generally mounted to a dashboard using adhesive or a window using a suction plate.

When the mobile phone is separated by a user or naturally in long-term using, components of the adhesive may deteriorate appearance and may damage the panel.

Also, when effect of the suction plate is reduced, the holder may be separated from the window to damage the mobile phone, or the holder may interrupt view of a driver, or a separated power jack is required for charging the mobile phone. And the separated power jack for charging the mobile phone may deteriorate appearance indoor of the vehicle.

Also, various charging connectors are required for charging terminals with various sizes and various kinds of each manufacturer.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mobile phone holder which may change a charging connector to be used to a various kind of a charging terminal of various mobile phones.

According to various aspects of the present invention, a mobile phone holder mounted to a docking portion which is provided with a power plug and formed to a center fascia may include a supporter selectively mounted to the docking portion and a connecting pin connected with the power plug provided at an end of the supporter, a center cradle rotatably mounted to another end of the supporter, and provided with a connecting terminal thereto, an upper cradle disposed at an upper portion of the center cradle and supporting an upper portion of a mobile phone, a moving unit disposed within the center cradle and selectively sliding the upper cradle according to a size of the mobile phone, and a charging unit provided with a charging connector electrically connected with the connecting terminal corresponding to a charging terminal of the mobile phone, and assembled to or disassembled from the center cradle, and the charging unit fixing the mobile phone to the center cradle by connecting the charging terminal of the mobile phone with the charging connector.

The supporter may include a body portion provided with the connecting pin, a release button disposed at a side of the body portion, and at least one fixing hook inserted into a connection hole formed to the docking portion to connect the body portion to the docking portion according to operations of the release button.

The connecting pin may be electrically connected with the connecting terminal formed to the center cradle.

The charging unit may include a charging cradle provide with the charging connector to an upper portion thereof corresponding to the charging terminal of the mobile phone and a charging pin to a side thereof corresponding to the connecting terminal, an insert end connecting the charging cradle to the center cradle, a rotating hook rotatably disposed within the charging cradle and connecting the charging cradle to the center cradle, and a hook button rotatably mounted to the charging cradle and selectively rotating the rotating hook to connect or disconnecting the rotating hook to or from the center cradle.

The charging pin may be electrically connected with the charging connector.

An insertion hole for the insert end to be inserted thereto and a hook hole for the rotating hook to be inserted thereto may be formed to the center cradle.

A size and a kind of the charging connector may be selected corresponding to the charging terminal of the mobile phone.

The moving unit may include first and second sliders which are disposed within the center cradle apart from each other, slidable along a rail hole formed to the center cradle, provided with a rail rod connected to an end thereof, and connected with the upper cradle through another end thereof, a first elastic member elastically supporting the first slider, and a damper mounted to a side of the first slider within the center cradle to control moving speed of the first slider.

The first and the second sliders may be guided by a guider disposed within the center cradle.

A train of gears may be formed to the side of the first slider, a rotation gear may be formed to the damper corresponding to the train of gears and the rotation gear may be engaged with the train of gears.

A notch may be formed to a side of the second slider and a locker, of which one end is protruded from the center cradle, selectively engaged with the notch to limit movement of the second slider may be disposed within the center cradle.

A plurality of protrusions corresponding to the notch may be formed to the locker and the protrusions may be selectively engaged with the notch.

A second elastic member may be inserted between another end of the locker and a support block disposed within the center cradle for elastically supporting the other end of the locker.

The mobile phone holder according to various embodiments of the present invention may be mounted to the docking portion formed to the center fascia, and is electrically connected with the power plug provided to the docking portion and thus other power line is not required and may improve appearance.

While the moving unit provided to the mobile phone holder may move the upper cradle according to a size of the mobile phone, thus the mobile phone holder may be used for various sizes and kinds of the mobile phones in common.

The mobile phone holder according to various embodiments of the present invention may be provided with the various charging cradles with various charging connectors to be connected to the charging terminals with various sizes and kinds of the mobile phone of various manufacturers, and thus costs for purchasing various mobile phone holders.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
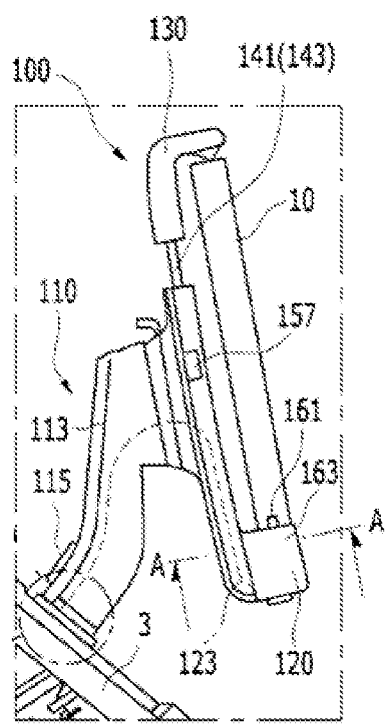
FIG. 1A, FIG. 1B and FIG. 1C are side views showing an exemplary mobile phone holder for a vehicle according the present invention.
Figure 1B:
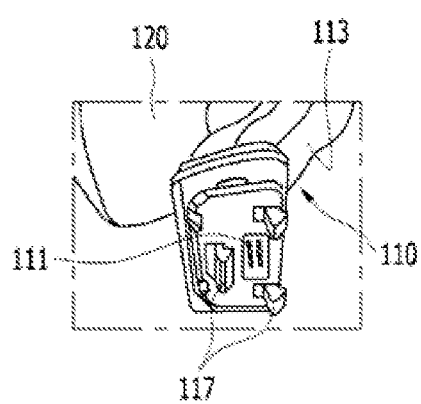
Figure 1C:
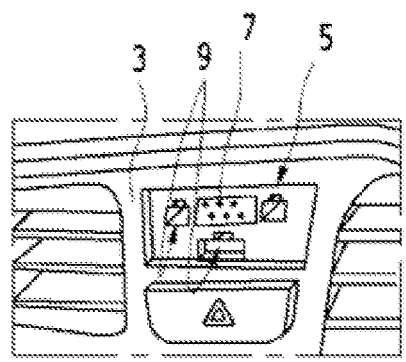
Figure 2:
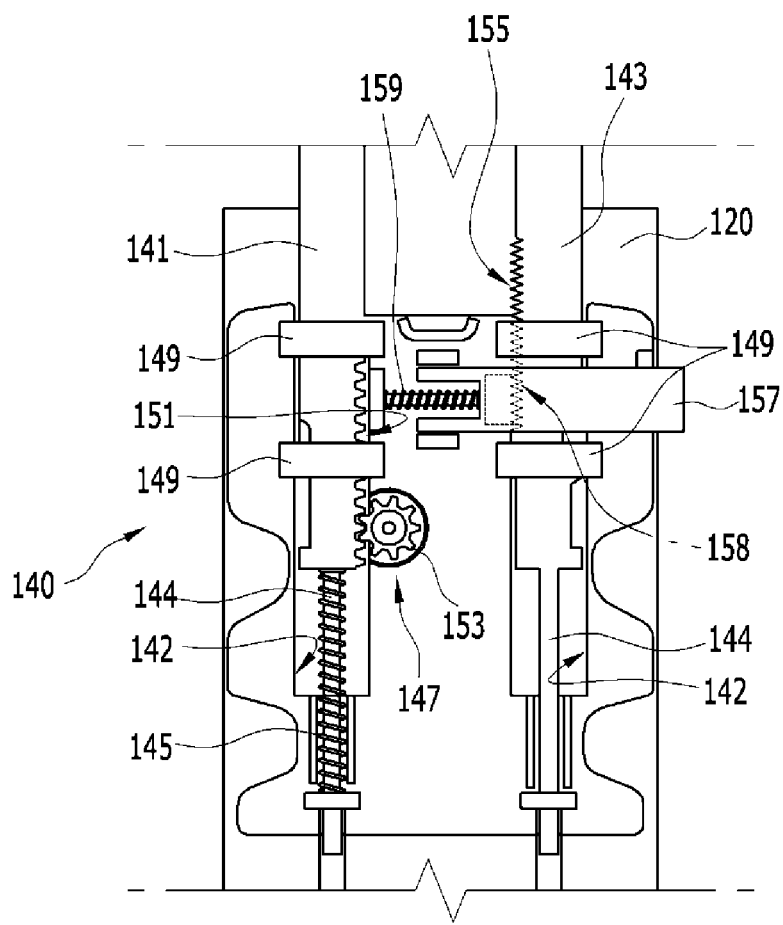
FIG. 2 and FIG. 3 are drawings showing a moving unit applied to the exemplary mobile phone holder for the vehicle according to the present invention.
Figure 3:
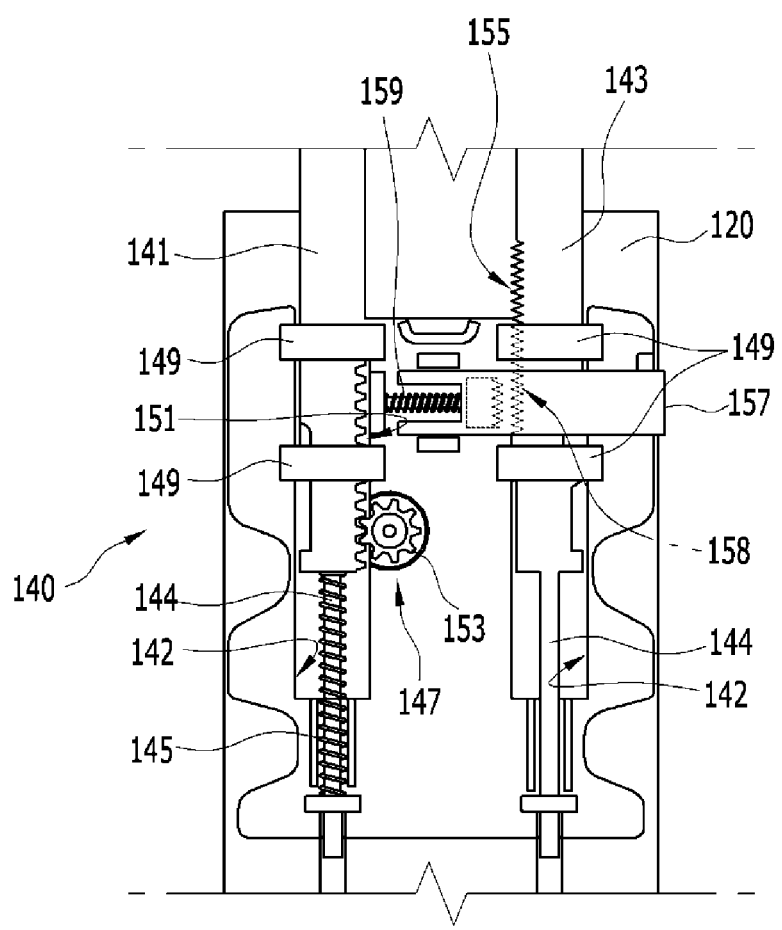
Figure 4:
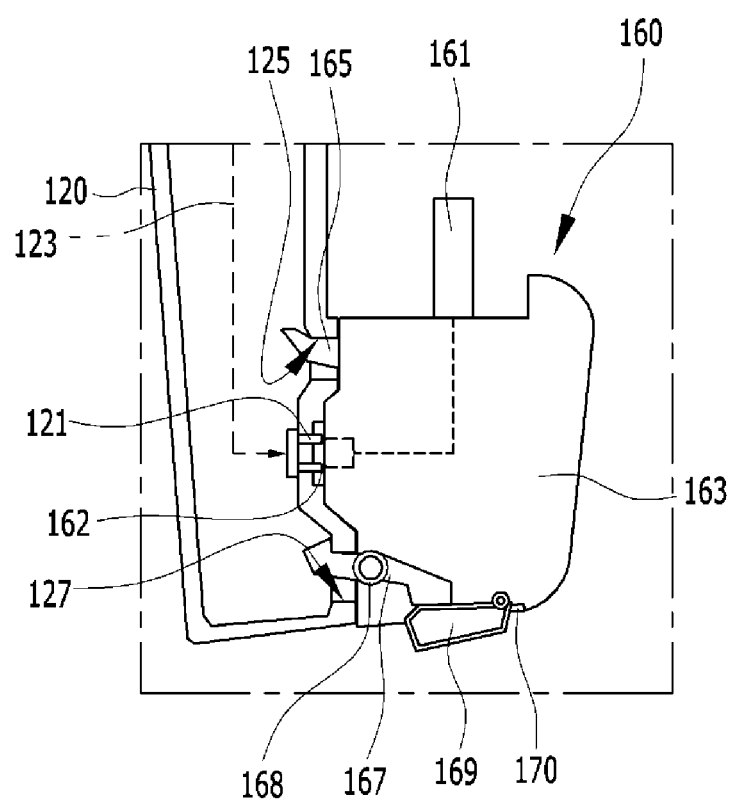
FIG. 4 is a cross-sectional view of line A-A of FIG. 1A.

FIG. 1A, FIG. 1B and FIG. 1C are side views showing a mobile phone holder for a vehicle according various embodiments of the present invention, FIG. 2 and FIG. 3 are drawings showing a moving unit applied to a mobile phone holder for a vehicle according various embodiments of the present invention, and FIG. 4 is a cross-sectional view of line A-A of FIG. 1A.

Referring to the drawings, a mobile phone holder 100 for a vehicle according to various embodiments of the present invention is mounted to a docking portion 5 which is provided with a power plug 7 and formed to a center fascia 3. The mobile phone holder 100 includes a supporter 110, a center cradle 120, an upper cradle 130, a moving unit 140 and a charging unit 160.

Throughout the specification and the claims, the mobile phone holder 100 is comprehensively defined inducing a cellular phone, a smart phone and so on as well as a terminal which may supply and receive data as a tablet PC, PDA and so on.

The supporter 110 is selectively mounted to the docking portion 5, and a connecting pin 111 connectable to the power plug 7 is disposed to an end thereof.

The supporter 110 includes a body portion 113, a release button 115 and a fixing hook 117.

The body portion 113 is provided with the connecting pin 111.

The release button 115 is disposed to a side of the body portion 113, and at least one fixing hook 117 is slidable at the body portion 113 according to operations of the release button. The fixing hook 117 may be inserted into a connection hole 9 formed to the docking portion 5 for the body portion 113 to be fixed to the docking portion 5.

As shown in FIG. 1B, 3 fixing hooks 117 may be provided and a connecting pin 111 may be disposed among them, but is not limited thereto.

The center cradle 120 is rotatably mounted to the other end of the supporter 110, and is provided with a connecting terminal 121 thereto.

In this case, the connecting pin 111 is electrically connected with the connecting terminal 121, for example through an electric wire 123 disposed within the body portion 113.

By rotating the center cradle 120 with respect to the supporter 11 by a user, the mobile phone 10 may be positioned along horizontally or vertically.

The upper cradle 130 is disposed upward of the center cradle 120 to fix an upper portion of the mobile phone 10.

The moving unit 140 is mounted within the center cradle 120 and may change a position of the upper cradle 130 by sliding the upper cradle 130 corresponding to various sizes of the mobile phone 10.

The moving unit 140, referring to FIG. 2, includes first and a second sliders 141 and 143, a first elastic member 145 and a damper 147.

The first and the second sliders 141 and 143 are disposed within the center cradle 120 apart from each other, slidable along a rail hole 142 formed to the center cradle 120, provided with a rail rod 144 connected to an end of the first and the second sliders 141 and 143, and connected with the upper cradle 130 through the other end of the first and the second sliders 141 and 143.

The first and the second sliders 141 and 143 are guided by a guider 149 disposed within the center cradle 120.

The first elastic member 145 is interposed between the first slider 141 and the center cradle 120 for elastically supporting the first slider 141.

The first elastic member 145 may be a coil spring of which one end is supported by the first slider 141 and the other end is supported by the center cradle 120. For example, the rail rod 144 of the first slider 141 may be disposed within the first elastic member 145.

When the first slider 141 slides along the rail hole 142 within the center cradle 120, the second slider 143 connected with the first slider 141 through the upper cradle 130 slides along the rail hole 142.

The damper 147 is mounted to a side of the first slider 141 within the center cradle 120 and controls moving speed of the first slider 141.

A train of gears 151 is formed to a side of the first slider 141 along length direction thereof.

A rotation gear 153 is formed to the damper 147 corresponding to the train of gears 151 and the rotation gear 153 is engaged with the train of gears 151.

When the first slider 141 slides by elastic force of the first elastic member 145, the first slider 141 slides smoothly along the rail hole 142 by the damper 147 engaged with the train of gears 151 through the rotation gear 153.

A notch 155 is formed to a side of the second slider 143 and a locker 157, of which one end is protruded from the center cradle 120, selectively engaged with the notch 155 to limit movement of the second slider 143 is disposed within the center cradle 120.

A plurality of protrusions 158 corresponding to the notch 155 are formed to the locker 157 and the protrusions 158 are selectively engaged with the notch 155. When a user pushes one end of the locker 157, the engagement of the protrusions 158 and the notch 155 is released.

A second elastic member 159 is disposed between the other end of the locker 157 and a support block 156 disposed within the center cradle 120 and elastically pushes the other end of the locker 157.

While the second elastic member 159 of which one end is supported by the support block 156 elastically pushes the locker 157, the protrusions 158 are engaged with the notch 155.

When a user pushes the locker 157, the engagement of the protrusions 158 and the notch 155 is released, and then the first and the second sliders 141 and 143 and the upper cradle 130 move upward by the elastic force of the first elastic member 145.

In this state, a user locates the mobile phone 10 between the center cradle 120 and the upper cradle 130 and pushes the upper cradle 130, the upper cradle 130 contacts the upper portion of the mobile phone 10. Then if the locker 157 is released, the protrusions 158 of the locker 157 is engaged with the notch 155 by the elastic force of the second elastic member 159 so as to fix the upper cradle 130.

With those operations, the upper portion of the mobile phone 10 is fixed by the upper cradle 130.

The charging unit 160 is provided with a charging connector 161 corresponding to a charging terminal of the mobile phone 10, and is assembled to the center cradle 120 separable from the center cradle 120. The charging terminal of the mobile phone 10 is inserted into the charging connector 161 electrically connected with the connecting terminal 121 to mount the mobile phone 10 to the center cradle 120.

The charging unit 160, as shown in FIG. 4, includes a charging cradle 163, an insert end 165, a rotating hook 167 and a hook button 169.

The charging connector 161 corresponding to the charging terminal of the mobile phone 10 is disposed to the charging cradle 163 and a charging pin 162 inserted into the connecting terminal 121 is disposed to the charging cradle 163.

The charging pin 162 is electrically connected with the charging connector 161 within the charging cradle 163.

The charging connector 161 may be formed with various sizes and kinds corresponding to the charging terminal of the various mobile phones 10.

The charging unit 160 may be provided with various charging connectors 161 to be connected to the charging terminals of the mobile phone 10 with various sizes and kinds of various manufacturers, and thus a user may select the charging unit 160 corresponding to the charging terminals of the mobile phone 10 and mount the charging unit 160 to the center cradle 120.

The insert end 165 is protruded and fixes an upper portion of the charging cradle 163 to the center cradle 120.

The rotating hook 167 is disposed under the insert end 165 and is rotatably mounted within the charging cradle 163. One end of the rotating hook 167 may be protruded from the charging cradle 163 and the rotating hook 167 fixes a lower portion of the charging cradle 163 to the center cradle 120.

The hook button 169 is disposed at a lower part of the charging cradle 163 corresponding to the other end of the rotating hook 167, and selectively rotates the rotating hook 167 by a user's operation to release or fix the rotating hook 167 to the center cradle 120.

An insertion hole 125 for the insert end 135 to be inserted thereto is formed to an upward of the connecting terminal 121 and a hook hole 127 for the rotating hook 167 to be inserted thereto are formed under the insertion hole 125.

In the state that the insert end 165 is inserted into the insertion hole 125 of the center cradle 120 and the rotating hook 167 is inserted into the hook hole 127, and then the charging cradle 163 is fixed to the center cradle 120.

A torsion spring 168 may be mounted to a rotation center of the rotating hook 167 for returning the rotating hook 167 to initial position and a plate spring 170 may be disposed to elastically support the hook button 169.

Figure 5:
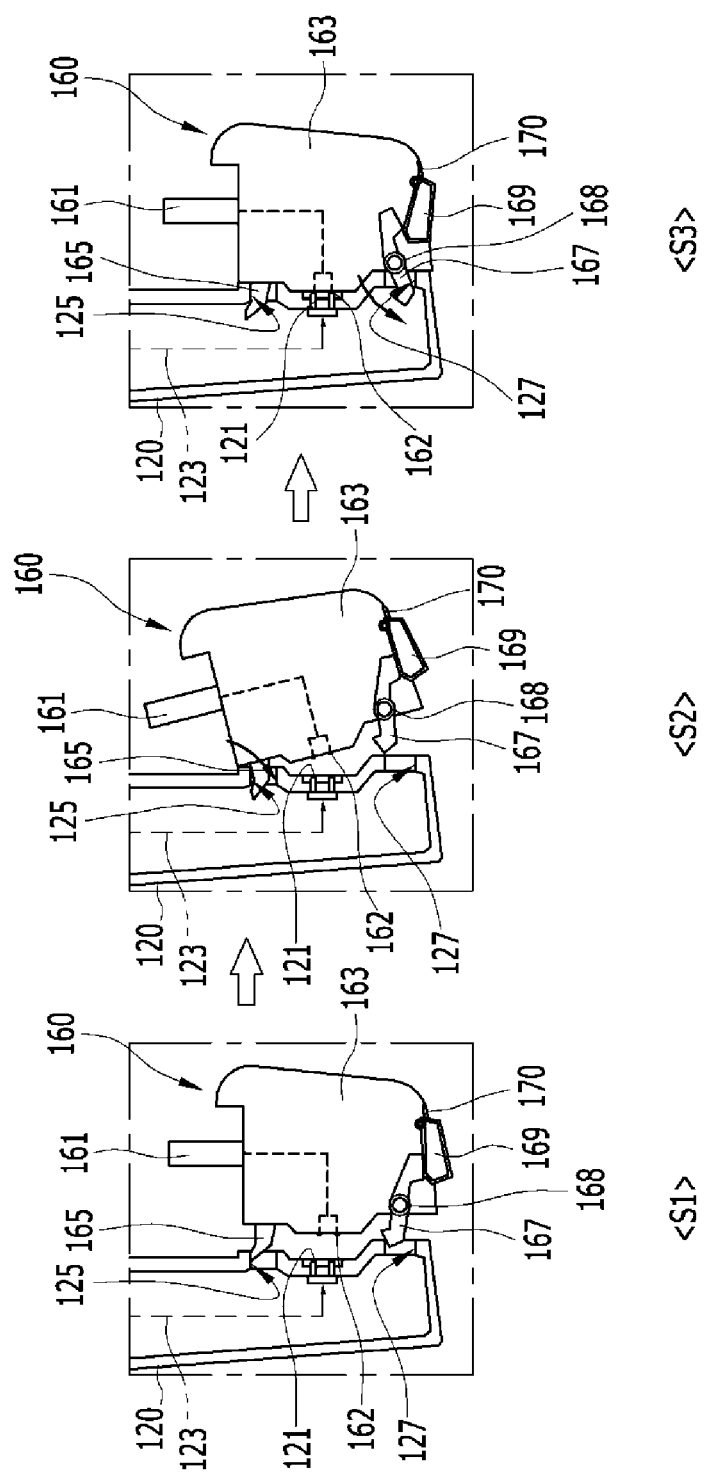
FIG. 5 is a drawing showing assembling method of a charging unit applied to a mobile phone holder for a vehicle according an exemplary embodiment of the present invention.

Referring to FIG. 5, a mounting method of the charging unit 160 to the center cradle 120 will be discussed.

FIG. 5 is a drawing showing assembling method of a charging unit applied to a mobile phone holder for a vehicle according to various embodiments of the present invention.

A user may select the charging unit 160 with the charging connector 161, which matches the charging terminal of the mobile phone 10 to be mounted to the mobile phone holder 100, and then as shown in Si of FIG. 5, hold the charging cradle 163 and insert the insert end 165 into the insertion hole 125.

Then the user inserts the insert end 165 into the insertion hole 125, as shown in S2 of FIG. 5, for the rotating hook 167 to be connected to the hook hole 127. In this state, the user may push the hook button 169 to rotate the hook button 169 to be inserted into the hook hole 127 smoothly.

The user, as shown in S3 of FIG. 5, may separate the rotating hook 167 the hook hole 127 by pushing the hook button 169.

The user may select and mount the charging unit 160 with the charging connector 161, which matches the charging terminal of the mobile phone 10 to the mobile phone holder 100 by repeating the above processes.

In the description of the mobile phone holder 100 according to various embodiments of the present invention, the upper cradle 130 may move up and down by the operation of the moving unit 140. However it is not limited thereto, on the contrary, the moving unit 140 may move the upper cradle 130 to left and right directions with respect to the center cradle 120 by changing the positions of the moving unit 140 and the upper cradle 130.

The mobile phone holder 100 according to various embodiments of the present invention may be mounted to the docking portion 5 formed to the center fascia 3, and is electrically connected with the power plug provided to the docking portion 5 and thus other power line is not required and may improve appearance.

While the moving unit 140 provided to the mobile phone holder 100 may move the upper cradle 130 according to a size of the mobile phone 10, thus the mobile phone holder 100 may be used for various sizes and kinds of the mobile phones 10 in common.

The mobile phone holder 100 according to various embodiments of the present invention may be provided with the various charging cradles 163 with various charging connectors 161 to be connected to the charging terminals with various sizes and kinds of the mobile phone 10 of various manufacturers, and thus costs for purchasing various mobile phone holders 100.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mobile phone holder for a vehicle mounted to a docking portion which is provided with a power plug and formed to a center fascia, the holder comprising:
    a supporter selectively mounted to the docking portion and a connecting pin connected with the power plug provided at an end of the supporter;
    a center cradle rotatably mounted to another end of the supporter, and provided with a connecting terminal thereto;
    an upper cradle disposed at an upper portion of the center cradle and supporting an upper portion of a mobile phone;
    a moving unit disposed within the center cradle and selectively sliding the upper cradle according to a size of the mobile phone; and
    a charging unit provided with a charging connector electrically connected with the connecting terminal corresponding to a charging terminal of the mobile phone, and assembled to or disassembled from the center cradle, and the charging unit fixing the mobile phone to the center cradle by connecting the charging terminal of the mobile phone with the charging connector,
    wherein the charging unit includes:
        a charging cradle provided with the charging connector to an upper portion thereof corresponding to the charging terminal of the mobile phone and a charging pin to a side thereof corresponding to the connecting terminal;
        an insert end connecting the charging cradle to the center cradle;
        a rotating hook rotatably disposed within the charging cradle and connecting the charging cradle to the center cradle; and
        a hook button rotatably mounted to the charging cradle and selectively rotating the rotating hook to connect or disconnect the rotating hook to or from the center cradle.

2. The holder of claim 1, wherein the supporter includes:
    a body portion provided with the connecting pin;
    a release button disposed at a side of the body portion; and
    at least one fixing hook inserted into a connection hole formed to the docking portion to connect the body portion to the docking portion according to operations of the release button.

3. The holder of claim 2, wherein the connecting pin is electrically connected with the connecting terminal formed to the center cradle.

4. The holder of claim 1, wherein the charging pin is electrically connected with the charging connector.

5. The holder of claim 1, wherein an insertion hole for the insert end to be inserted thereto and a hook hole for the rotating hook to be inserted thereto are formed to the center cradle.

6. The holder of claim 1, wherein a size and a type of the charging connector are selected corresponding to the charging terminal of the mobile phone.

7. The holder of claim 1, wherein the moving unit includes:
    first and second sliders which are disposed within the center cradle apart from each other, slidable along a rail hole formed to the center cradle, provided with a rail rod connected to an end thereof, and connected with the upper cradle through another end thereof;
    a first elastic member elastically supporting the first slider; and
    a damper mounted to a side of the first slider within the center cradle to control moving speed of the first slider.

8. The holder of claim 7, wherein the first and the second sliders are guided by a guider disposed within the center cradle.

9. The holder of claim 7, wherein:
    a train of gears is formed to the side of the first slider,
    a rotation gear is formed to the damper corresponding to the train of gears, and
    the rotation gear is engaged with the train of gears.

10. The holder of claim 7, wherein:
    a notch is formed to a side of the second slider, and
    a locker, of which one end is protruded from the center cradle, selectively engaged with the notch to limit movement of the second slider is disposed within the center cradle.

11. The holder of claim 10, wherein:
    a plurality of protrusions corresponding to the notch are formed to the locker, and
    the protrusions are selectively engaged with the notch.

12. The holder of claim 11, wherein a second elastic member is inserted between another end of the locker and a support block disposed within the center cradle for elastically supporting the other end of the locker.

13. A mobile phone holder for a vehicle mounted to a docking portion which is provided with a power plug and formed to a center fascia, the holder comprising:
    a supporter selectively mounted to the docking portion and a connecting pin connected with the power plug provided at an end of the supporter;
    a center cradle rotatably mounted to another end of the supporter, and provided with a connecting terminal thereto;
    an upper cradle disposed at an upper portion of the center cradle and supporting an upper portion of a mobile phone;
    a moving unit disposed within the center cradle and selectively sliding the upper cradle according to a size of the mobile phone; and a charging unit provided with a charging connector electrically connected with the connecting terminal corresponding to a charging terminal of the mobile phone, and assembled to or disassembled from the center cradle, and the charging unit fixing the mobile phone to the center cradle by connecting the charging terminal of the mobile phone with the charging connector, wherein the moving unit includes:
first and second sliders which are disposed within the center cradle apart from each other, slidable along a rail hole formed to the center cradle, provided with a rail rod connected to an end thereof, and connected with the upper cradle through another end thereof;
a first elastic member elastically supporting the first slider; and
a damper mounted to a side of the first slider within the center cradle to control moving speed of the first slider.

14. The holder of claim 13, wherein the first and second sliders are guided by a guider disposed within the center cradle.

15. The holder of claim 13, wherein:
a train of gears is formed to the side of the first slider,
a rotation gear is formed to the damper corresponding to the train of gears, and
the rotation gear is engaged with the train of gears.

16. The holder of claim 13, wherein:
a notch is formed to a side of the second slider, and
a locker, of which one end is protruded from the center cradle, selectively engaged with the notch to limit movement of the second slider is disposed within the center cradle.

17. The holder of claim 16, wherein:
a plurality of protrusions corresponding to the notch are formed to the locker, and
the protrusions are selectively engaged with the notch.

18. The holder of claim 17, wherein a second elastic member is inserted between another end of the locker and a support block disposed within the center cradle for elastically supporting the other end of the locker.

* * * * *